United States Patent
Yamamoto et al.

(10) Patent No.: US 7,637,159 B2
(45) Date of Patent: Dec. 29, 2009

(54) VIBRATION GYRO AND THE PROCESS OF PRODUCING THE SAME

(75) Inventors: Izumi Yamamoto, Tokorozawa (JP); Takashi Moriya, Tokorozawa (JP); Tomoo Ikeda, Tokorozawa (JP); Atsushi Murakami, Tokorozawa (JP); Akihiro Shioji, Tokororzawa (JP)

(73) Assignee: Citizen Holdings Co., Ltd., Tokyo (JP)

( * ) Notice: Subject to any disclaimer, the term of this patent is extended or adjusted under 35 U.S.C. 154(b) by 315 days.

(21) Appl. No.: 11/716,662

(22) Filed: Mar. 12, 2007

(65) Prior Publication Data
US 2008/0022769 A1 Jan. 31, 2008

(30) Foreign Application Priority Data
Mar. 14, 2006 (JP) ............................. 2006-069234
Mar. 5, 2007 (JP) ............................. 2007-054469

(51) Int. Cl.
*G01P 9/04* (2006.01)
*H01L 41/22* (2006.01)

(52) U.S. Cl. .................................. 73/504.16; 29/25.35

(58) Field of Classification Search .............. 73/540.15, 73/504.16
See application file for complete search history.

(56) References Cited

U.S. PATENT DOCUMENTS 5,861,705 A * 1/1999 Wakatsuki et al. ....... 73/504.16

FOREIGN PATENT DOCUMENTS

| JP | 2002-243451 A | 8/2002 |
| JP | 2003-156337 A | 5/2003 |
| JP | 2004-93158 A | 3/2004 |
| JP | 2004-294354 A | 10/2004 |

* cited by examiner

*Primary Examiner*—John E Chapman
(74) *Attorney, Agent, or Firm*—Westerman, Hattori, Daniels & Adrian, LLP

(57) ABSTRACT

An inclination of an inclined surface formed by working a ridge of a resonator is set to be within a predetermined angular range, whereby a leakage of vibration in the out-of-plane direction is reduced, the leakage of vibration being generated according to the detuning degree adjustment. In addition, a single laser beam is irradiated onto the ridge at an incident angle within a predetermined angular range, whereby a simple working on the inclined surface is established for the leakage vibration adjustment. A degree of the leakage vibration of the resonator is determined based on a relationship with the drift amount that is a ratio of the angular velocity change, and the inclination of the inclined surface is set to be within a predetermined angular range, thereby suppressing the drift amount.

7 Claims, 16 Drawing Sheets

VIBRATION GYRO AND THE PROCESS OF PRODUCING THE SAME

DETAILED DESCRIPTION

1. Field of the Invention

The present invention relates to a vibration gyro that is used to detect an angular velocity, and the process of producing the same.

2. Related Art

A vibration gyro is employed in a mechanism such as a camera shake compensation mechanism in a home video unit and a position detecting mechanism in a vehicle navigation system, so as to detect a vibration due to hand movement or a rotation angle of a vehicle.

According to the physical law, when viewed from a coordinate system rotating at the angular velocity O, a moving object receives a Coriolis force Fc in proportion to a relative velocity V of the object in a direction orthogonal to the velocity. A magnitude and a direction of the Coriolis force are expressed by the following equation:

$$Fc = 2mV \times O \quad \text{(Equation 1)}$$

In this equation, "m" represents a mass of the object on which the Coriolis force acts.

The vibration gyro is an angular velocity sensor that detects a rotation, and imparts a shaking movement to an object such as a resonator. When a rotary motion acts on this resonator being in shaking movement, the rotary motion puts the Coriolis force in a direction orthogonal to the shaking direction of the resonator. The vibration gyro catches this Coriolis force acting on the resonator, whereby a rotation is detected and an angular velocity is measured. Various forms of resonators have been suggested as a resonator to be used in the vibration gyro, such as tuning-fork type and vibrating bar type.

As shown in FIG. 15A and FIG. 15B, there is suggested a vibration gyro that uses a resonator having three tines 5 (see Japanese Unexamined Patent Application Publication No. 2003-156337 (FIG. 1), which will be referred to as "patent document 1"). In the patent document 1, it is disclosed that the vibration gyro has the effects such as the followings: both a driving vibration that shakes the resonator and a detecting vibration caused by the Coriolis force are allowed to vibrate without any influence from a supporting part that supports the resonator; drift is low; and an S/N ratio is preferable.

A material of the resonator used for the vibration gyro is quartz, for example. The quartz is an anisotropic piezoelectric single crystal belonging to a trigonal system, and it has as crystal axes, an optical axis (Z axis), an electrical axis (X axis), and a mechanical axis (Y axis) that is orthogonal to the optical axis and the electrical axis. When a direction to which the tines are aligned is assumed as the X axis, and directions obtained by rotating the Y axis and the Z axis by angle θ, about the X axis as a rotation axis, are respectively assumed as Y' axis and Z' axis, a direction to which the tines of the resonator extends corresponds to the Y' axis and its thickness direction corresponds to the Z' axis.

This resonator 1 includes a supporting part 7, a base 3, and three tines 5. The base 3 and the three tines 5 are structured to be approximately uniform in thickness. The three tines 5 are the same in length and arranged in parallel with one another. Width W1 of one of the two tines on both sides is made to be approximately the same as the width W2 of the tine in the center, and these two tines are assumed as drive tines 15. The width W3 of the other one of the two tines on both sides is made to be approximately three-fifth of the width of the two tines W1 and W2, and this tine is assumed as a detection tine 17.

This resonator 1 causes a vibration by driving the drive tines 15 in the aligning direction of the tines, i.e., within a plane formed by the two drive tines 15. The vibrating direction within this plane is assumed as "in-plane direction C". According to this driving, the two drive tines 15 are subjected to bending vibration, and they repeat approaching each other and separating from each other. This vibration is a so-called tuning fork type vibration. Each of the two drive tines 15 has a natural resonance frequency approximately equal therebetween within the in-plane direction C. Since the two drive tines 15 have approximately identical thickness, length, and width, the vibration is balanced therebetween. Therefore, a leakage vibration directing to the supporting part 7 hardly occurs.

Since the width W3 of the detection tine 17 is three-fifth of W1 and W2 of the drive tines 15, the natural resonance frequency is substantially different from that of the drive tines 15. Therefore, the vibration of the two drive tines 15 and the vibration of the detection tine 17 do not interfere with each other. When the two drive tines 15 vibrate at their natural resonance frequency, they are vibrated keeping the balance therebetween, while the detection tine 17 stands still nearly completely.

When a rotation is applied from the outside onto this resonator 1, the Coriolis force is generated in a direction perpendicular to the movement direction of the drive tines 15, as described above. In other words, the Coriolis force is generated in the direction perpendicular to the plane that is formed by the two drive tines 15. The drive tines 15 start vibrating in the direction perpendicular to this in-plane direction C. Here, a direction perpendicular to the in-plane direction C is referred to as "out-of-plane direction D". The detection tine 17 stands still when no rotation is applied. On the other hand, when a rotation is applied, the detection tine 17 starts vibrating in the out-of-plane direction D, in such a manner as balancing with the Coriolis force generated in the drive tines 15. This vibration of the detection tine 17 is referred to as a detecting vibration.

The magnitude of the vibration of this detection tine 17 is proportional to the magnitude of the Coriolis force. As seen from the Equation 1, since the magnitude of the Coriolis force is proportional to the angular velocity O, if the vibration of the detection tine 17 is detected, the angular velocity O can be known. By setting the width W3 of the detection tine 17 to be three-fifth of the width W1 and W2 of the drive tines 15, the vibration of the two drive tines 15 and the vibration of the detection tine 17 are balanced with each other, also in the vibration in the out-of-plane direction. Therefore, the leakage vibration directing to the supporting part 7 hardly occurs. These findings are also disclosed in the patent document 1.

In the vibration gyro using the resonator above, both the vibrations of the driving vibration and the detecting vibration hardly leak towards the supporting part 7. Therefore, the driving vibration and the detecting vibration Q are high and a large detection signal S can be obtained. In addition, when any is not applied to the vibration gyro (during rest), the detection tine 17 stands still, and the detection tine 17 does not start vibrating in the out-of-plane direction until when a rotation is applied. Therefore, noise N during rest is small. Consequently, it is possible to enhance the S/N ratio that is a ratio of magnitude of signal S to the noise N, and further drift can be suppressed.

However, it is to be noted that the operation of the vibration gyro as described above can be implemented only under an ideal condition. In reality, symmetry in shape may be broken due to an error in manufacturing, or anisotropy of a material. Therefore, following situations may be possible: a vibration in out-of-plane direction occurs even in the driving vibration; and a vibration of the detection tine in the out-of-plane direction occurs even in the state where no rotation is applied. A detected output obtained by sensing such vibrations may cause a noise and/or drift.

In order to remove the leakage vibration that is generated by the vibrations in the out-of-plane direction as described above, the Japanese Unexamined Patent Application Publication No. 2002-243451 (FIG. 10) discloses a method that grinds a corner of the tine by a grinding tape, and adjusts the vibration state by reducing the weight of the tine.

The Japanese Unexamined Patent Application Publication No. 2004-93158 (FIG. 6) discloses a method that irradiates multiple laser beams from multiple laser directions, thereby removing a protruding part on a corner of the tine for adjustment.

The Japanese Unexamined Patent Application Publication No. 2004-294354 (FIG. 1) discloses a method to reciprocate a grindstone, thereby reducing the weight of a corner of the tine for adjustment.

These adjustments as described above are performed while monitoring the detection signal, and the adjustment is carried out so that a detection signal which is detected when no rotation is applied indicates an output that is found when the angular velocity is zero.

Thereafter, so-called detuning degree is adjusted, which is a difference frequency between the natural resonance frequency of driving vibration and the natural resonance frequency of detecting vibration. As a method to adjust the detuning degree, the resonator is soaked in an etching liquid made of a mixed solution, for example, including hydrofluoric acid and ammonium fluoride. When the resonator is etched, the natural resonance frequency of driving vibration and the natural resonance frequency of detecting vibration are changed respectively. In this etching, since the quartz is an anisotropy material, the etching rate is different between in the width direction of the resonator and in the thickness direction thereof. Therefore, the natural resonance frequency of driving vibration at which the drive tine vibrates in the in-plane direction is changed at a ratio being different from the changing ratio of the natural resonance frequency of detecting vibration at which the detection tine vibrates in the out-of-plane direction. The adjustment of the detuning degree can be carried out by utilizing the difference in changing manner between the driving vibration frequency of the drive tine and the detecting vibration frequency of the detection tine.

When the drive tine is cut out in order to eliminate the leakage of vibration in the out-of-plane direction, a work-affected layer is generated by alteration in quality on the worked surface. Therefore, the steps to adjust the detuning degree also have a roll to remove such work-affected layer.

However, the conventional adjusting method using the polishing tape has a problem that it is difficult to work a small-sized resonator. Since the vibration gyro in recent years requires downsizing of the resonator, such working method inadequate for such small-sized resonator is not appropriate for the vibration gyro of recent years.

As for the method that employs more than one laser beams, it divides the laser beam into multiple pencils of light and irradiates these light pencils from multiple directions. This is to prevent damages against a part surrounding a point to be worked, which may occur when a single laser beam deviates from the portion to be worked and irradiates the surrounding part. With this configuration, it is difficult to keep the laser beam at a constant illuminating angle against the worked surface of the resonator.

FIG. 16A and FIG. 16B are cross sectional views of the resonator to explain a machining state by the conventional laser beam. FIG. 16A and FIG. 16B each shows a cross sectional view of the tine of the resonator. FIG. 16C shows crystal axes of the tine, and axial directions of Y' axis and Z' axis are shown by turning about the X axis only by θ.

A cross sectional shape shown in FIG. 16A includes a cross section worked by the laser beam. FIG. 16A illustrates a state where the laser beams E are irradiated from multiple directions onto a corner of the tine 5. The lower end G of the worked portion F that is cut by the laser beams E has a shape almost perpendicular to the Z axis of the crystal axis. Therefore, when the tine worked by the laser beams is soaked in an etching liquid in performing the detuning degree adjustment, the surface scraped by the leakage vibration adjustment is subjected to the etching selectively in the Z axial direction by a large amount, since the etching rate is large in the Z axial direction.

FIG. 16B illustrates a state after the etching has been performed. The lower end G of the worked portion F is etched by a large amount in the Z axial direction, and a bottom end surface H is generated. This may cause a deviation in mass balance of the tine, and there may be a problem that a leakage vibration occurs again and the vibration in the in-plane direction leaks towards the out-of-plane direction.

Furthermore, in the conventional method that uses a grindstone, there is a problem that it takes time for adjusting. Oscillation stops while the grindstone is in contact with the resonator. Therefore, it is not possible to monitor a detection signal while cutting with the grindstone. Therefore, it is necessary to repeat each of the following steps: a working step by the grindstone; a step to detect a detection signal while the grindstone is moved away from the resonator after the working step; a checking step to check a work result based on the detection signal; and a step for reworking based on the work result. Those multiple steps as described above may prolong the adjusting time.

In view of the problems as described above, an object of the present invention is to reduce a vibration leakage in the out-of-plane direction that occurs along with the adjustment of detuning degree of the resonator. Another object of the present invention is to perform the leakage vibration adjustment by a simple working.

SUMMARY OF THE INVENTION

According to the present invention, a ridge of a drive tine constituting a resonator is worked, the ridge extending in the longitudinal direction, so that a vibration state of the resonator is adjusted. The inventors of the present application have found that there is a relevancy between an inclined angle of an inclined surface formed on the worked portion, and a leakage vibration of the resonator, and also found that the leakage vibration of the resonator can be suppressed within a predetermined range by setting this inclined angle within a predetermined angular range.

On the basis of the knowledge above, in the present invention, the inclined angle of the inclined surface formed by working the ridge of the resonator is set to be within a predetermined angular range, and a vibration leakage in the out-of-plane direction is reduced, which is generated along with a detuning degree adjustment. Furthermore, a single laser beam is irradiated against the ridge at an incident angle within a predetermined angular range, whereby the working of the inclined surface can be performed simply.

The drift amount is suppressed by setting the inclined angle of the inclined surface to be within a predetermined angular range by determination the degree of the leakage vibration of the resonator in relation to a drift amount as a ratio of the angular velocity change.

According to the present invention, the ridge of the tine of the vibration gyro is worked at a bevel with respect to a surface of the resonator. Therefore, a plane in the Z axial direction does not appear. Accordingly, there are effects that the worked surface is not etched by a large amount, when the detuning degree adjustment is performed in the subsequent step, and the leakage vibration in the out-of-plane direction may not be changed dramatically.

Furthermore, when a laser beam is employed in the working, the working can be carried out in non-contact manner. Therefore, there are effects that it is not necessary to stop the oscillation of the resonator even during the working process, and the adjustment while continuously monitoring the detection signals from the detection tine is possible, thereby establishing a high-speed adjustment.

The present invention includes an aspect of an apparatus of the vibration gyro, and an aspect of a process of producing the vibration gyro. In the apparatus aspect of the vibration gyro, there is more than one embodiment of the vibration gyro according to the present invention.

A first apparatus embodiment of the vibration gyro has a vibration tine including a drive tine and a detection tine. The drive tine has a pillar with a rectangular cross section, and at least one ridge extending in the longitudinal direction of the pillar has an inclined surface. The inclined angle of the inclined surface is within the range from 20° to 40°, the angles being made between a side parallel to a vibrating direction of the drive tine, as one of the sides of the rectangular cross section, and an extended line along the inclined surface.

A second apparatus embodiment of the vibration gyro has the vibration tine including the drive tine and the detection tine, similar to the apparatus of the first embodiment, and this vibration tine is made of quartz. The vibration tine made of quartz has the pillar with the rectangular cross-section, in axial directions held by the quartz; electrical axis, mechanical axis, and optical axis, being orthogonal to one another, X axis being the electrical axis is set as a vibrating direction of the drive tine, an axial direction obtained by rotating Y axis being the mechanical axis about the X axis by a predetermined angle θ is set as a longitudinal direction of the drive tine, and an axial direction obtained by rotating Z axis being the optical axis about the X axis by the predetermined angle θ is set as a thickness direction of the drive tine. The thickness direction is orthogonal to the longitudinal direction and the vibration direction of the drive tine.

In the first apparatus embodiment and the second apparatus embodiment, an inclined surface is formed on at least one of the ridge extending along the longitudinal direction of the drive tine. The inclined angle of the inclined surface is within the range from 20° to 40°, which are angles the inclined surface makes with the side parallel to the vibrating direction of the drive tine in the first apparatus embodiment, and which are angles the inclined surface makes with the X axis in the second apparatus embodiment.

In the first apparatus embodiment, in the rectangular cross section of the drive tine, two inclined surfaces can be taken on both edges of the side parallel to the vibrating direction of the drive tine. In the second apparatus embodiment, in the rectangular cross section of the drive tine, two inclined surfaces can be taken, in the positive direction and in the negative direction of the X axial direction. When viewed from the side parallel to the vibrating direction or from the X axial direction, the angle made between the X axis and the inclined surface may be different between the two selectable points, i.e., the sign of the angle is positive or negative. However, the angles having the opposite signs can be defined as the same, if only a narrow angle is noted among the angles made between the side being parallel to the vibrating direction or to the X axis, and the inclined surface or an extended inclined surface, and this narrow angle is set to be within the angular range from 20° to 40°.

Similar to the second apparatus embodiment, in a third apparatus embodiment, the vibration gyro has the vibration tine including the drive tine and the detection tine, wherein the vibration tine is made of quartz and the inclined angle of the inclined surface may be within an angular range that is different between in the positive direction and the negative direction of the X axial direction.

In the third apparatus embodiment, the apparatus may include the drive tine similar to the second apparatus embodiment, and at least one ridge extending along the longitudinal direction of the drive tine has an inclined surface. This inclined surface includes, in the rectangular cross section, at least one of a first inclined surface on +X side ridge, and a second inclined surface on –X side ridge.

Here, the inclined angle of the first inclined surface on the +X side ridge is within the range of angles 25° to 40°, and 55° to 70°, which are angles the inclines surface makes with the X axis in the rectangular cross section. On the other hand, the inclined angle of the second inclined surface on the –X side ridge is within the range of angle 20° to 35°, which the inclined surface makes with the X axis in the rectangular cross section.

The inclined surface on the +X side and the inclined surface on the –X side have the same angular relationship with respect to the Z' axis. However, the crystal anisotropy of quartz may cause a difference in the etching rate after the working.

Furthermore, the vibration tine may have a configuration made up of two drive tines and one detection tine. Two drive tines are arranged with the objective that both vibrating surfaces formed by each vibration constitute an identical plane. On the other hand, the vibrating surface formed by the vibration of the detection tine is orthogonal to the vibrating surfaces of the drive tines.

The above described angular ranges from 25° to 40° and from 20° to 35°, and the angular range from 55° to 70° can be defined using as an index, a degree of the leakage vibration of the resonator, the leakage vibration being determined by a relationship with the drift amount that is a ratio of the angular velocity change. In addition, the leakage vibration of the resonator can be obtained from the vibration state of the detection tine.

Next, in the aspect of the process of producing the vibration gyro, the vibration gyro of the present invention may have more than one embodiment.

In a first process embodiment of producing a vibration gyro, in a configuration of the vibration gyro having a vibration tine including a drive tine and a detection tine and the drive tine having a pillar with a rectangular cross section, the vibration gyro is formed by working at least one ridge extending along the longitudinal direction of this pillar.

Here, this process includes a step to form an inclined surface on a ridge of the rectangular cross section, by irradiating a single laser beam onto the ridge at a predetermined angle with respect to a side parallel to a vibrating direction of the drive tine, as one of the sides of the rectangular cross section.

In the first process embodiment, an illuminating angle at which the laser beam is irradiated onto the drive tine is orthogonal to the longitudinal direction of the pillar, and in the rectangular cross section, corresponds to an elevation-angle within the range of 20° to 40° from a side being parallel to the vibrating direction of the drive tine, as one of the sides of the rectangular cross section, when viewing an irradiation source of the laser beam from the side.

In a second process embodiment of producing the vibration gyro, the drive tine of the first process embodiment is made of quartz, and similar to the first process embodiment, this process includes a step to form an inclined surface on a ridge of the rectangular cross section, by irradiating a single laser beam onto the ridge at a predetermined angle with respect to a side parallel to the vibrating direction of the drive tine, as one of the sides of the rectangular cross section. An illuminating angle to irradiate the laser beam onto the drive tine is orthogonal to the longitudinal direction of the pillar, and in the rectangular cross section, corresponds to an elevation-angle within the range of 20° to 40° from the X axis, when viewing the irradiation source of the laser beam from the X axis.

In the process of producing the vibration gyro, the first process embodiment and the second process embodiment form an inclined surface on at least one ridge extending along the longitudinal direction of the drive tine. The inclined angle of this inclined surface is set to be within the range from 20° to 40°. In the first process embodiment, these are the angles made between the side parallel to the vibrating direction of the drive tine and a line directing to the laser beam source, and in the second process embodiment, these are the angles made between the X axis and the line directing to the laser beam source.

In the first process embodiment, two worked portions for the inclined surface can be taken on both edges of the side parallel to the vibrating direction of the drive tine, in the rectangular cross section thereof. In the second process embodiment, in the rectangular cross section of the drive tine, two worked portions for the inclined surface can be taken, in the positive direction and in the negative direction of the X axial direction. When viewed from the side parallel to the vibrating direction or from the X axial direction, the angle made between the X axis and the inclined surface may be different between the two selectable points, i.e., the sign of the angle is positive or negative. However, the angles having the opposite signs can be defined as the same, if only a narrow angle is noted among the angles made between the side being parallel to the vibrating direction or to the X axis, and the inclined surface or an extended inclined surface, and this narrow angle is set to be within the angular range from 20° to 40°.

In a third process embodiment of producing the vibration gyro according to the present invention, similar to the second process embodiment, the vibration gyro has the vibrating tine including the drive tine and the detection tine, the process includes a step of working the vibrating tine made of quartz and a step of working, using an inclined angle of the inclined surface, the range of the angle being different between in the positive direction and in the negative direction of the X axis.

In the third process embodiment, similar to the third apparatus embodiment of the vibration gyro, an angle for working of the first inclined surface on the +X side ridge is within the range of 25° to 40°, and 55° to 70°, which are angles the inclined surface makes with the X axis in the rectangular cross section. An angle for working of the second inclined surface on the −X side ridge is within the range of 20° to 35°, which are angles the inclined surface makes with the X axis in the rectangular cross section.

The inclined surface on the +X side and the inclined surface on the −X side have the same angular relationship with respect to Z' axis. However, the crystal anisotropy of quartz may cause a difference in the etching rate after the working.

In the third process embodiment, angles for working respectively of the inclined angles of the first inclined surface and the second inclined surface are determined in response to the difference in etching rate.

In addition, a femtosecond laser may be employed as the laser beam. By the use of the femtosecond laser, it is possible to perform an adjustment that hardly causes damages on the worked surface, and the working and adjustment may be carried out without causing any damage onto a part other than the part to be worked. Since an irradiating time of the femtosecond laser is extremely short, an adjustment of the irradiance level of the laser beam becomes easier, and it is possible to improve the working accuracy.

The process to produce the vibration gyro can be applied to any cutting means, without limited to the cutting means using the irradiation of laser beam. This process is a way to produce the vibration gyro that has the vibrating tine including the drive tine and the detection tine, the drive tine being a pillar having a rectangular cross section, the vibration gyro being formed by working at least one ridge extending along the longitudinal direction of this pillar, and this process includes a step to form an inclined surface on the ridge. The inclined angle of the inclined surface is within the range of 20° to 40°, which are inclinations in the rectangular cross section, when viewed from a side parallel to the vibrating direction of the drive tine, as one of the sides provided in the rectangular cross section.

The embodiment where the process of producing the vibration gyro according to the present invention is applied to the drive tine made of quartz, includes the steps, in axial directions held by the quartz; electrical axis, mechanical axis, and optical axis, being orthogonal to one another, setting the X axis being the electrical axis as a vibrating direction of the drive tine, setting an axial direction obtained by rotating the Y axis being the mechanical axis about the X axis by a predetermined angle θ as a longitudinal direction of the drive tine, and setting an axial direction obtained by rotating the Z axis being the optical axis about the X axis by the predetermined angle θ as a thickness direction of the drive tine, making the thickness direction to be orthogonal to the longitudinal direction and the drive vibrating direction, and forming an inclined surface on the ridge. In the step of forming this inclined surface, the inclined angle of the inclined surface is orthogonal to the longitudinal direction of the pillar, and in the rectangular cross section, the inclination viewed from the X axis is within the range of 20° to 40°.

In another embodiment where the process to produce the vibration gyro according to the present invention is applied to the drive tine made of quartz, in the step of forming the inclined surface on the ridge, an inclined angle of the first inclined surface on the +X side ridge is within the range of 25° to 40° and 55° to 70°, which are the angles the inclined surface makes with the X axis, and an inclined angle of the second inclined surface on the −X side ridge is within the range of 20° to 35°, which are the angles the inclined surface makes with the X axis.

According to the vibration gyro of the present invention, an etching amount of the worked surface caused in adjusting the detuning degree is lowered, and there is an effect that a leakage vibration in the out-of-plane direction may not change dramatically.

According to the present invention, it is possible to reduce the vibration leakage in the out-of-plane direction that is generated along with the detuning degree adjustment of the resonator. Furthermore, the leakage vibration adjustment can be performed with a simple working.

According to the present invention, in the etching step after the working step, an excessive etching is suppressed, and deterioration of the out-of-plane vibration can be reduced. Therefore, there is an effect that a vibration gyro that is small in noise and drift can be provided.

DETAILED DESCRIPTION

Hereinafter, a process to produce a vibration gyro relating to an embodiment of the present invention will be explained, with reference to the accompanying drawings. A resonator used in the vibration gyro produced by the process to produce the vibration gyro relating to the present embodiment is, for example, a three-tine tuning fork as shown in FIG. 1. However, as far as the vibration gyro uses an in-plane vibration and an out-of-plane vibration, as a driving vibration and a detecting vibration, respectively, any resonator can be applied, such as a vibrating bar and a two-tine tuning fork.

Here, as described above, the in-plane vibration is a vibration within a plane formed by two drive tines at the time when the vibration tines are vibrated, and the out-of-plane vibration is a vibration within a plane that is orthogonal to the plane formed by the two drive tines.

Figure 1A:
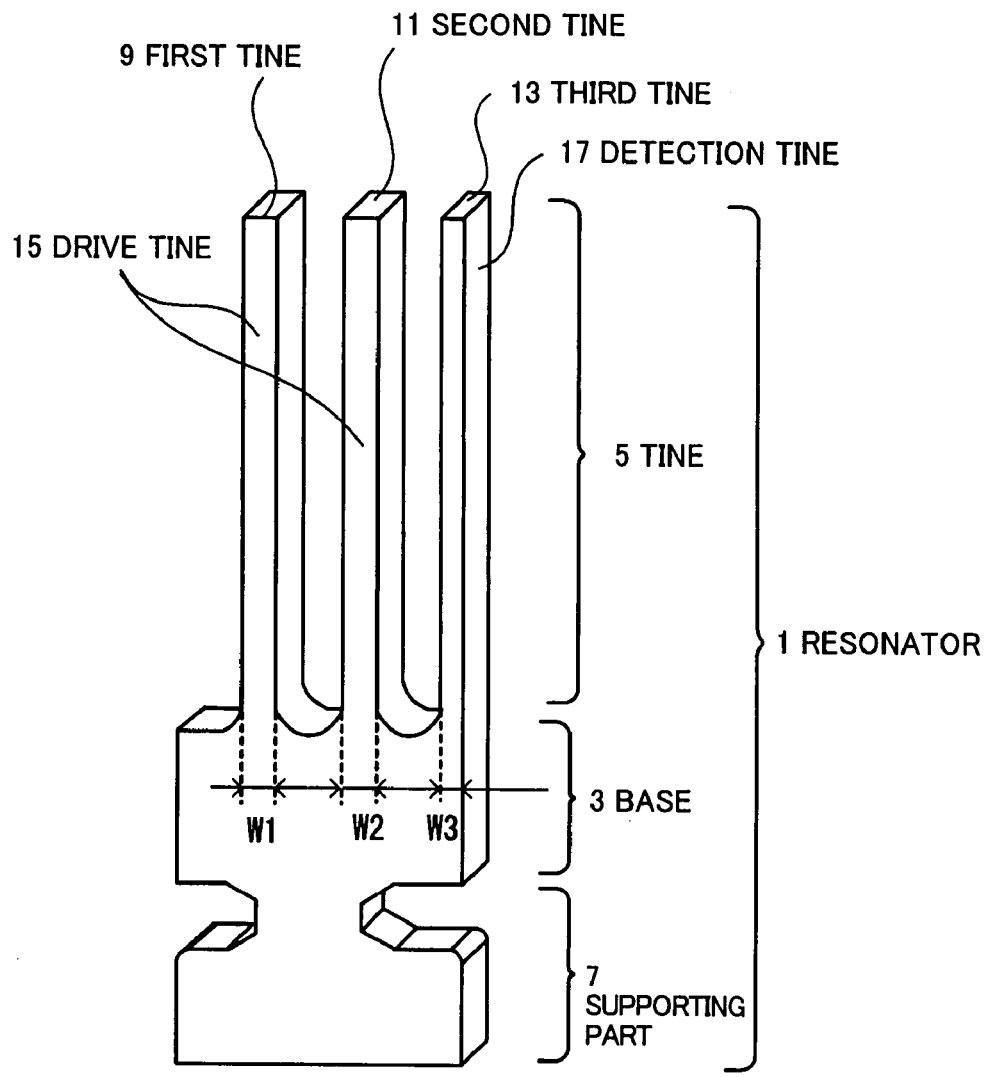
FIG. 1A and FIG. 1B illustrate a resonator of a vibration gyro according to an embodiment of the present invention.

The resonator 1 as shown in FIG. 1A is made of quartz, and it includes a base 3, three tines 5 extending from the base 3, and a supporting part 7 that extends from the base 3 in the direction opposite to the tines 5. The quartz is an anisotropic piezoelectric single crystal belonging to a trigonal system, and it has as crystal axes; an optical axis (Z axis), an electrical axis (X axis), and a mechanical axis (Y axis) that is orthogonal to the optical axis and the electrical axis.

Figure 1B:
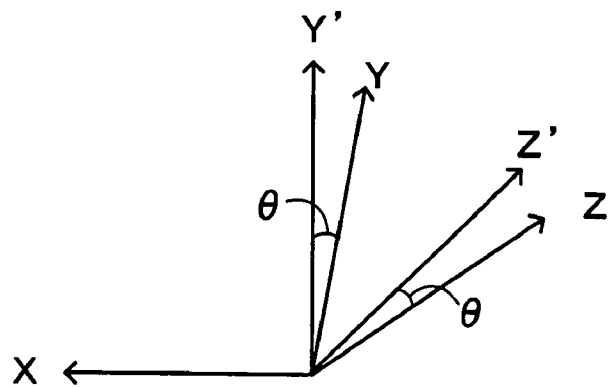

When a direction to which the tines are aligned is assumed as the X axis, directions obtained by rotating the Y axis and the Z axis by angle θ, about the X axis as a rotation axis, are respectively assumed as "Y' axis" and "Z' axis", a direction in which the tines 5 of the resonator 1 extend, corresponds to the Y' axis and a thickness direction of the resonator corresponds to the Z' axis. The angle θ is in the range of 0 to 10 degrees. This angle θ is set to be an optimum value using a property of temperature and vibration stability as index values. FIG. 1B illustrates each of the directions, X axis, Y axis, Z axis, Y' axis, and Z' axis.

For ease of explanation here, the tine positioned at the most plus side in the X axial direction (on the leftmost in FIG. 1A) is referred to as "a first tine 9", the tine in the center is referred to as "a second tine 11", and the tine positioned at the most minus side in the X axial direction is referred to as "a third tine 13". Unless otherwise specified, a distance in the X axial direction is referred to as "width", a distance in the Y' axial direction is referred to as "length", and a distance in the Z' axial direction is referred to as "thickness".

The tines 5, the base 3, and the supporting part 7 are formed as a single piece, and each has the thickness approximately the same. Width W1 of the first tine 9 and width W2 of the second tine 11 are approximately the same. Width W3 of the third tine 13 is approximately three-fifth of the width W1 of the first tine 9 and the width W2 of the second tine 11.

The first tine 9 and the second tine 11 constitute the drive tine 15, and they vibrate in bending manner within XY' plane that is formed by the X axial direction and Y' axial direction. When a rotation is applied to the drive tine 15 about the Y' axis, a Coriolis force is generated in the Z' axial direction, and the tines 5 start vibration in the out-of-plane direction. The first tine 9 and the second tine 11 vibrate in opposite directions within the in-plane direction. When the first tine 9 is bent towards the minus direction of the X axis, the second tine 11 is bent towards the plus direction of the X axis, and when the first tine 9 is bent towards the plus direction of the X axis, the second tine 11 is bent towards the minus direction of the X axis.

Therefore, when the Coriolis force acts on the first tine 9 in the plus direction of the Z' axis, it is the minus direction of the Z' axis in which the Coriolis force acts on the second tine 11. When the Coriolis force acts on the first tine 9 in the minus direction of the Z' axis, it is the plus direction of the Z' axis in which the Coriolis force acts on the second tine 11. Accordingly, a torsional vibration is generated on the base 3 with a central focus between the first tine 9 and the second tine 11 which are comprising the drive tine 15. On the other hand, the detection tine 17 being a third tine 13 responses to this torsional vibration on the base 3, and starts vibration in the out-of-plane direction in order to keep a balance. By sensing this motion, an angular velocity can be detected.

Figure 2A:
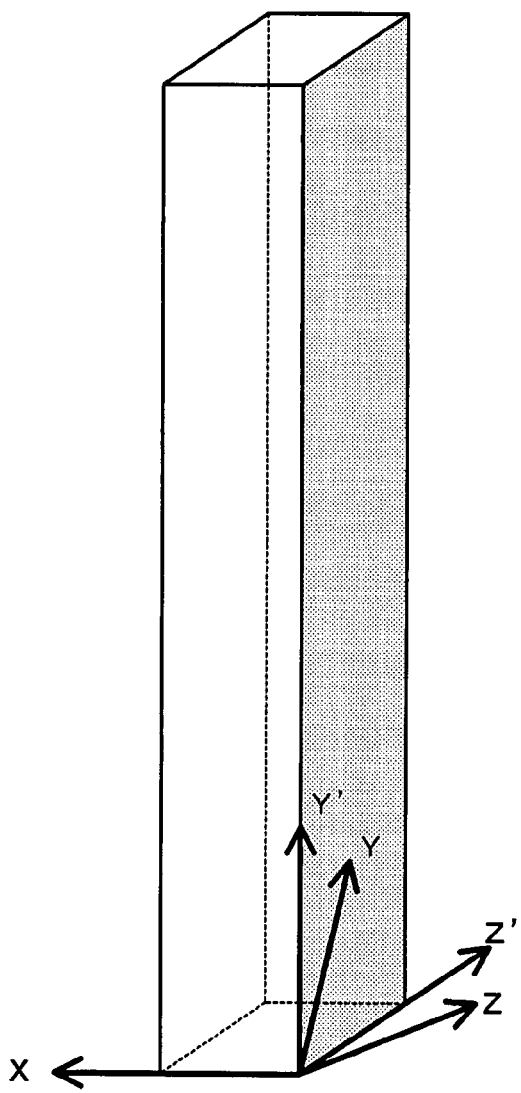
FIG. 2A and FIG. 2B illustrate a relationship among each crystal axis, Y' axis, and Z' axis, when a tine of the vibration gyro according to the present invention is made of quartz.
Figure 2B:
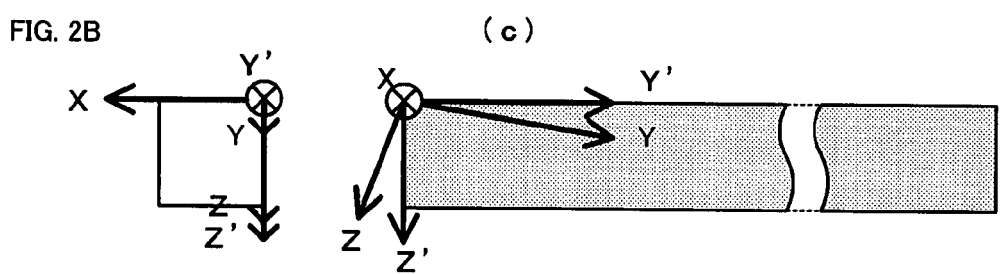

FIG. 2A, FIG. 2B and FIG. 2C show a relationship among the crystal axes each being X axis as an electrical axis, Y axis as a mechanical axis, and Z axis as an optical axis, and Y' axis and Z' axis which are respectively formed by rotating the Y axis and the Z axis about the X axis by θ. Here, the tines extend in the Y' axial direction, and Z' axis indicates a thickness direction of the rectangular cross section.

Figure 3:
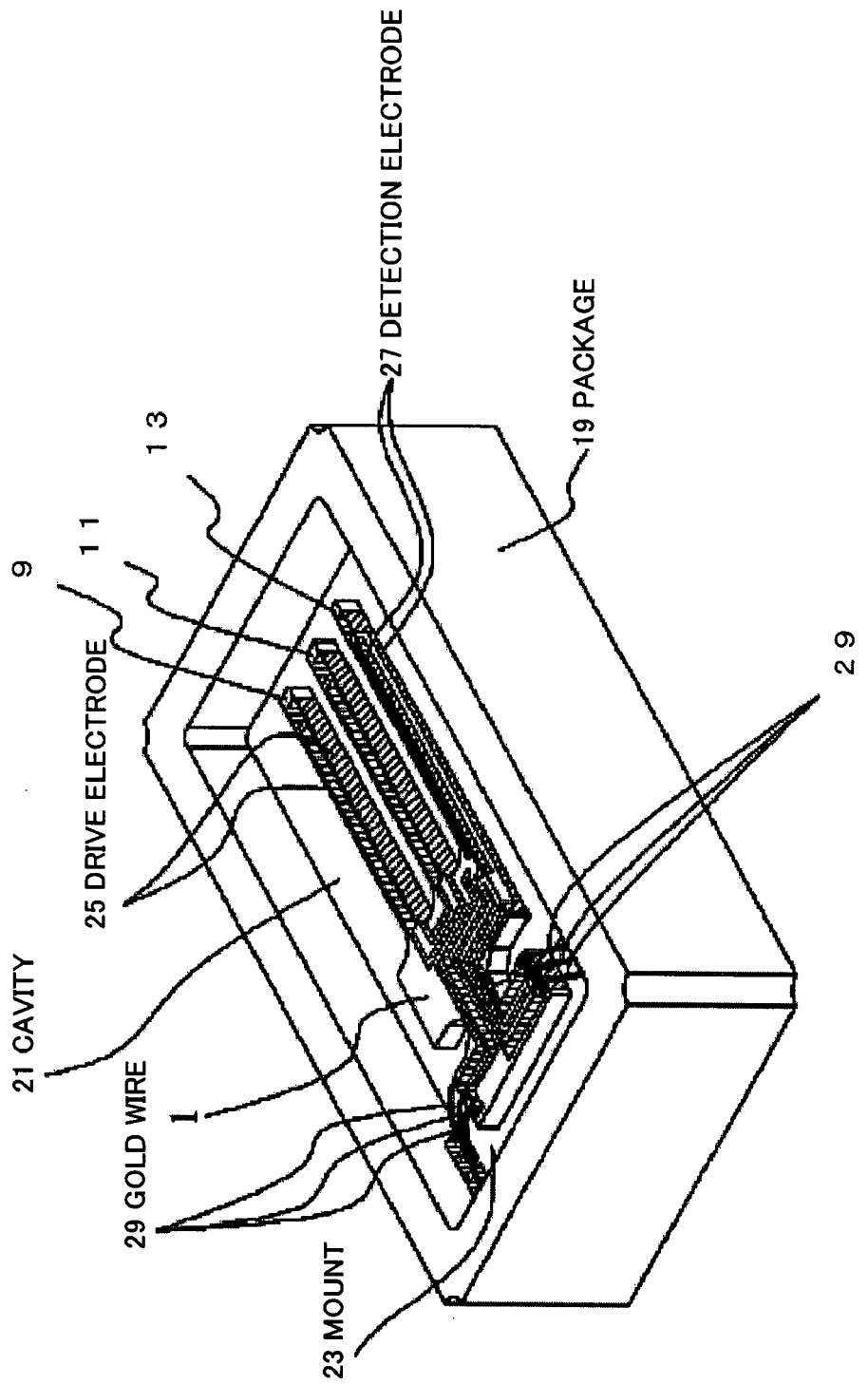
FIG. 3 shows a state how the resonator of the vibration gyro and a package are joined and an electrode structure of the resonator, in an embodiment of the present invention.

FIG. 3 shows a state how the resonator 1 and a package 19 are joined and an electrode structure of the resonator 1. The resonator 1 is attached to a mount 23 of the package 19 provided in the cavity 21, at a portion of the supporting part 7. Drive electrodes 25 for driving are formed in the first tine 9 and the second tine 11, and a detection electrode 27 is formed in the third tine 13 for detecting an angular velocity. Each of the electrodes is guided to the supporting part 7 via the base 3, and on the supporting part 7, these electrodes are electrically connected to terminals on the package 19 side by gold wires 29, respectively.

The package 19 is made of ceramics, and each of the terminals is guided to a bottom surface through the inside and outside the package 19, then being electrically connected to an IC and chip parts provided on the bottom, not illustrated. The cavity 21 is airtightly sealed with a cover, not illustrated. According to circumstances, the inside thereof may be evacuated to vacuum, or inactive gas at a certain pressure may be injected.

Figure 4A:
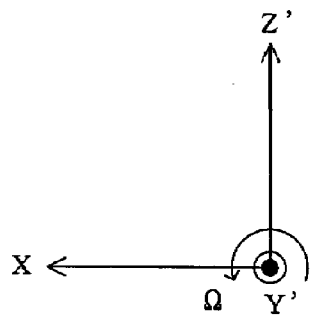
FIG. 4A and FIG. 4B illustrate an electrode structure in the cross section of the resonator tine of the vibration gyro, and a circuit block diagram thereof, according to an embodiment of the present invention.
Figure 4B:
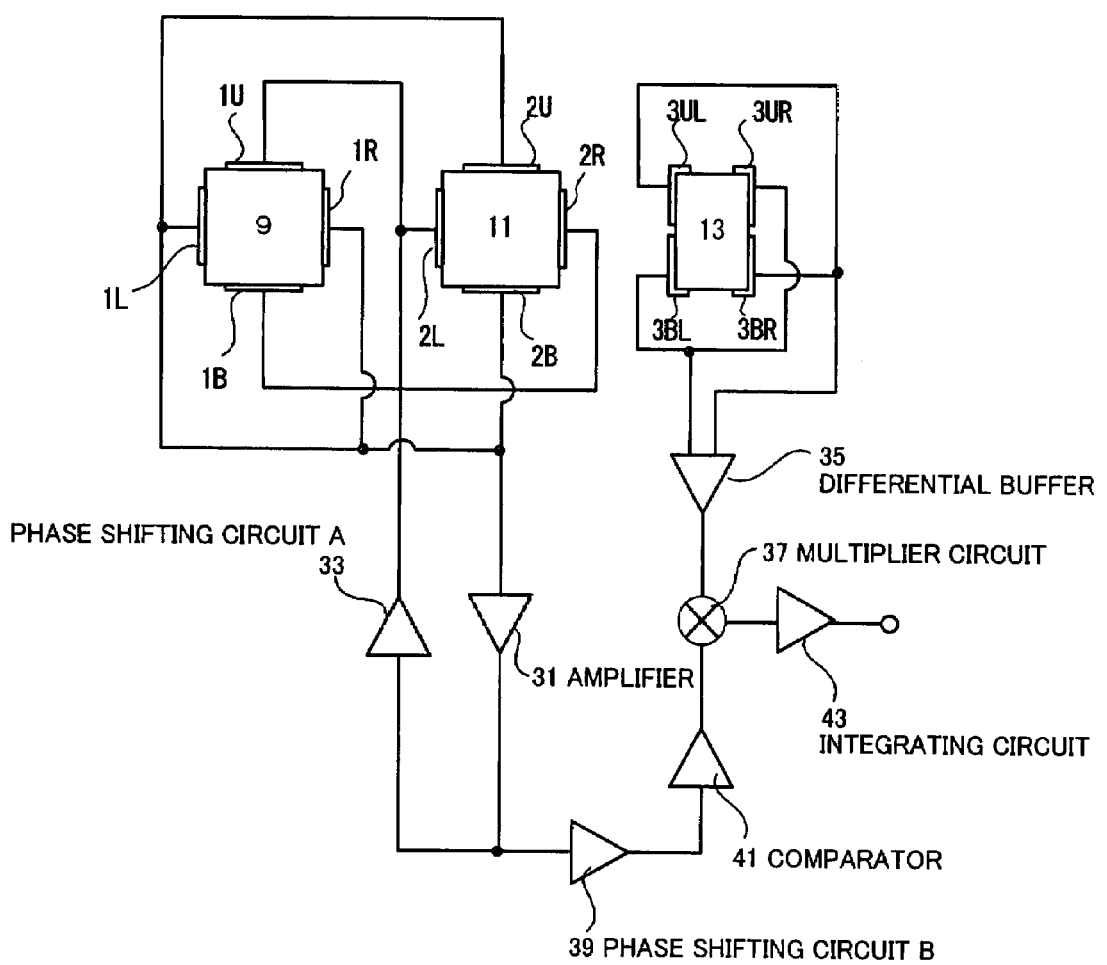

FIG. 4B is a cross sectional view of three tines of the resonator, and illustrates an electrode structure of the tines. In addition, FIG. 4B is also a schematic block diagram showing a circuitry block diagram and wiring. FIG. 4A shows axial directions.

In FIG. 4B, the electrodes 1L and 1R on the side surfaces being perpendicular to the X axis of the first tine 9 are respectively connected with the electrode 2U and 2B on the surfaces parallel to the X axis of the second tine 11, and those electrodes are at the same potential.

These electrodes are connected to an amplifier 31, passing through a phase shifting circuit A 33, and then connected to the electrodes 1U and 1B on the surfaces parallel to the X axis of the first tine 9 and the electrodes 2L and 2R on the surfaces perpendicular to the X axis of the second tine 11, thereby forming a self-oscillation circuitry.

If the potentials of the electrodes 1L, 1R, 2U, and 2B are higher than the potentials of the electrodes 1U, 1B, 2L, and 2R, an electric field in the minus direction of the X axis is applied on the left-half of the first tine 9, and an electric field in the plus direction of the X axis is applied on the right-half thereof. On the left-half of the second tine 11, an electric field in the plus direction of the X axis is applied, and on the right-half thereof, an electric field in the minus direction of the X axis is applied.

When the electric field in the plus direction of the X-axis is applied and an extension stress is generated in the quartz, and when the electric field in the minus direction of the X-axis is applied and a compression stress is generated in the quartz, the left-half of the first tine 9 is shrunk, and the right-half thereof is extended. Therefore, the first tine 9 is bent toward the plus direction of the X axis. As for the second tine 11, the left-half is extended and the right-half is shrunk, and therefore, the second tine 11 is bent towards the minus direction of the X axis.

On the other hand, if the potential of the electrodes 1L, 1R, 2U, and 2B is lower than the potential of the electrodes 1U, 1B, 2L, and 2R, an inverse electric field is applied relative to the above case. Therefore, the first tine 9 is bent towards the minus direction of the X axis, and the second tine 11 is bent towards the plus direction of the X axis. Since the above operations are repeated alternately, the first tine 9 and the second tine 11 vibrate in such a manner as being bent in the directions opposite to each other within the XY' plane. This is the driving vibration.

On this occasion, the width and the length of the first tine 9 and those of the second tine 11 are in balance equivalently. Therefore, the driving vibration becomes a self-contained vibration on the first tine 9 and the second tine 11. Furthermore, the detection tine being the third tine 13 has a width in the X axial direction largely different from the widths of the first tine 9 and the second tine 11. Therefore, a natural resonance frequency of the detection tine is considerably different from a frequency of the driving vibration. Therefore, the third tine stays still without joining the driving vibration.

If a rotary motion is applied about the Y' axis at an angular velocity O, while the driving vibration is in a state of self-oscillation, a Coriolis force acts on the first tine 9 and the second tine 11 that form the drive tine, and an out-of-plane vibration is started in the direction orthogonal to the XY' plane as described above. The third tine 13 also starts out-of-plane vibration in such a manner as keeping a balance with the out-of-plane vibration generated by the Coriolis force.

For instance, when the third tine 13 is bent in the plus direction of the Z' axis, in the illustration of FIG. 4B, the upper half of the third tine 13 is shrunk, and the lower half thereof is extended. According to the operation of this third tine 13, an electric field in the minus direction of the X axis is generated on the upper half of the third tine 13, and an electric field in the plus direction of the X axis is generated on the lower half of the third tine 13. On the other hand, when the third tine 13 is bent in the minus direction of the Z' axis, the upper half of the third tine 13 is extended, and the lower half thereof is shrunk. According to the operation of the third tine 13, an electric field in the plus direction of the X axis is generated on the upper half of the third tine 13, and an electric field in the minus direction of the X axis is generated on the lower half of the third tine 13.

Voltages are generated between the electrodes 3UL, 3BR and the electrodes 3UR, 3BL of the third tine 13, responding to those electric fields as described above. Signals from these electrodes are inputted into the differential buffer 35, and an output from the differential buffer 35 is guided to the multiplier circuit 37. On the other hand, an output from the amplifier 31 in the self-oscillation circuitry as described above is subjected to phase shifting approximately by 90 degrees in the phase shifting circuit B 39, and binarized by the comparator 41. Thereafter, the binarized output is guided to the multiplier circuit 37 as a reference signal and multiplied by the output from the differential buffer 35 to carry out wave detection. An output from the multiplier circuit 37 is smoothed by the integrating circuit 43 to become a DC output.

Hereinafter, there will be explained a process to adjust a leakage vibration towards the detecting vibration according to the driving vibration.

Figure 5:
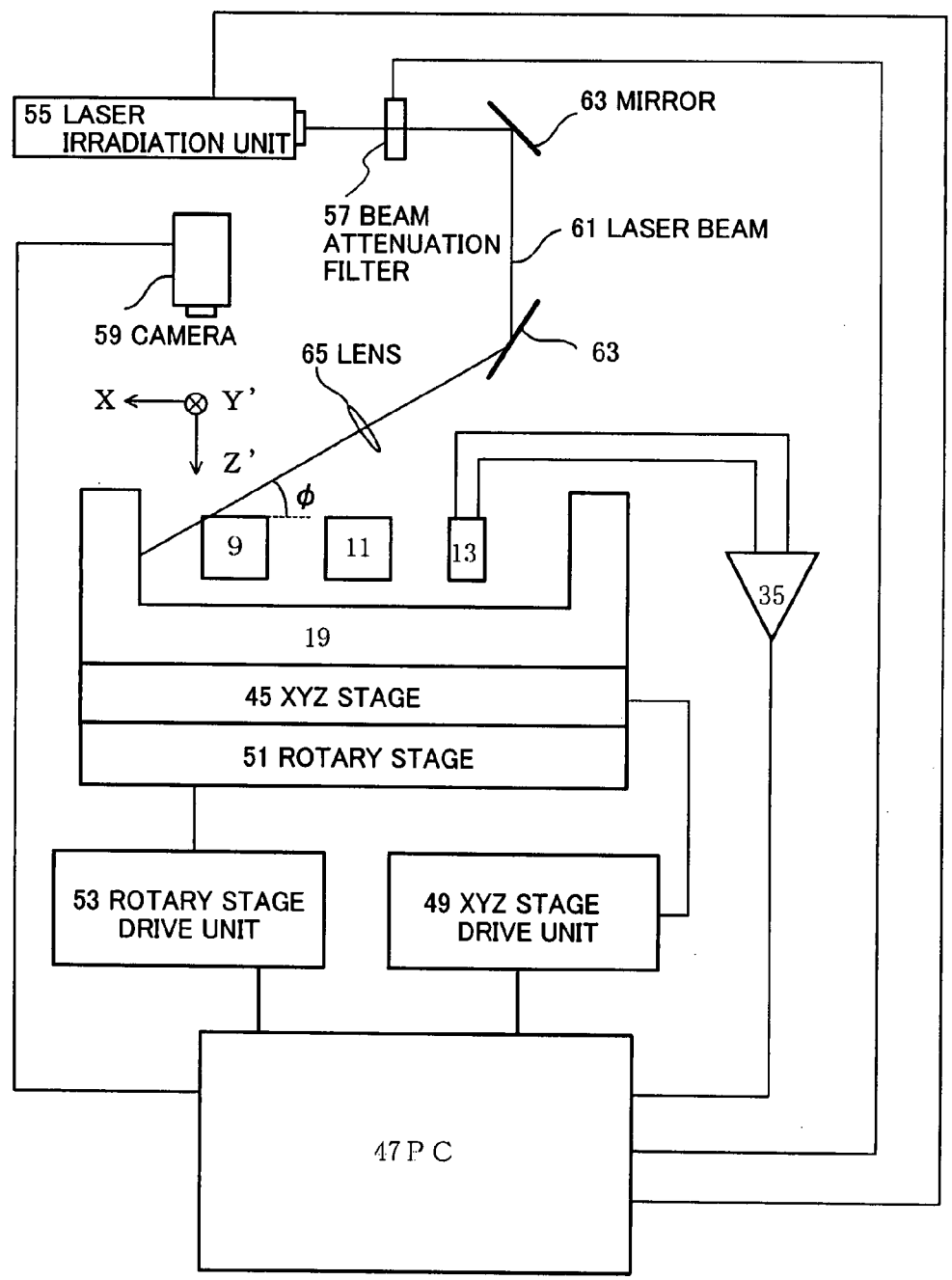
FIG. 5 is an explanatory diagram that schematically shows a leakage vibration adjustment device according to the present invention.

FIG. 5 is an explanatory diagram that schematically shows an adjustment device to be used in the adjustment process. A resonator placed in the package 19 is fixed on an XYZ stage 45. A signal from the detection electrode installed on the detection tine 13 is inputted into the differential buffer 35, and an output from the differential buffer 35 is monitored by the PC 47.

The XYZ stage 45 is driven by the XYZ stage drive unit 49, and positions (X, Y) and height (Z) are controlled by the PC 47 that is connected to the XYZ stage drive unit 49. More specifically, the XYZ stage 45 is mounted on the rotary stage 51, so that it is rotatable within the XY plane. The rotary stage 51 is connected to and driven by the rotary stage drive unit 53. The rotary stage drive unit 53 is connected to and controlled by the PC 47. In addition, the PC 47 is connected to a laser irradiation unit 55 and a beam attenuation filter 57, and controls each of these units. The PC 47 is also connected to a camera 59, and an image of the resonator taken by the camera is transmitted to the PC 47.

A laser beam 61 irradiated from the laser irradiation unit 55 passes through the beam attenuation filter 57 for adjusting the intensity of the light, and thereafter, a direction of the light beam is changed by a mirror 63 to be guided to the lens 65. The angle $\Phi$ made between a line directing to the laser beam irradiation source side and the principal surface (XY' plane) of the resonator is set to be within the range from 20° to 40°. The reason why the laser beam illuminating angle $\Phi$ is selected as such will be explained in detail in the following description. The laser beam 61 focused by the lens 65 is positioned and worked by the PC 47 so that the laser beam is focused on the ridge corner of the first tine 9 or the second tine 11, which form the drive tine.

The adjustment may be performed according to a procedure as the following. Firstly, an output from the differential buffer 35 before adjustment is stored in the PC 47. If this output is equal to or more than a predetermined value, the adjustment is stopped and it is determined as a defective.

Here, an output from the differential buffer 35 expresses a vibration state of the detection tine, and it corresponds to a leakage vibration of the resonator. Therefore, if the output from the differential buffer 35 is equal to or more than a predetermined value, it indicates that the leakage vibration of the resonator is large. In order to suppress this leakage vibration, the adjustment volume of the drive tine becomes large and this means that it takes a long time for adjustment.

When the output from the differential buffer 35 is within a predetermined range, the adjustment is started. While irradiating the laser beam 61 onto the ridge corner of the first tine 9, the laser beam 61 is scanned in the Y' axial direction and laser machining is performed. In response to this scanning of the laser beam, if the output from the differential buffer 35 is increased, it indicates that the machining inversely directed. Therefore, the rotary stage 51 is turned by 180 degrees and positioning is performed so that the ridge corner on the opposite side of the first tine is subjected to the laser machining, and then the adjustment is started. On the other hand, in response to this scanning of the laser beam, if the output from the differential buffer 35 is decreased, the laser machining is kept proceeding and the machining is continued until the output value becomes approximately 50% of the output value before the adjustment, which is stored. Afterwards, the second tine 11 is worked in the similar manner and the machining is performed until the output from the differential buffer approaches around zero. Thereafter, the adjustment is finished.

The adjustment can be performed by machining only either one of the first tine 9 and the second tine 11. However, both the first tine 9 and the second tine 11 are worked to a nearly equal degree, in order that the first tine 9 and the second tine 11 are kept in balance, and a CI value (crystal impedance) may not be deteriorated.

Positioning of the laser beam on the ridge corner of the tine may be performed by processing an image captured by the camera 59. However, it is more preferable that the position is figured out by using a method as the following, since it is possible to shorten a time relating to the image processing, or the image processing becomes unnecessary.

Figure 6:
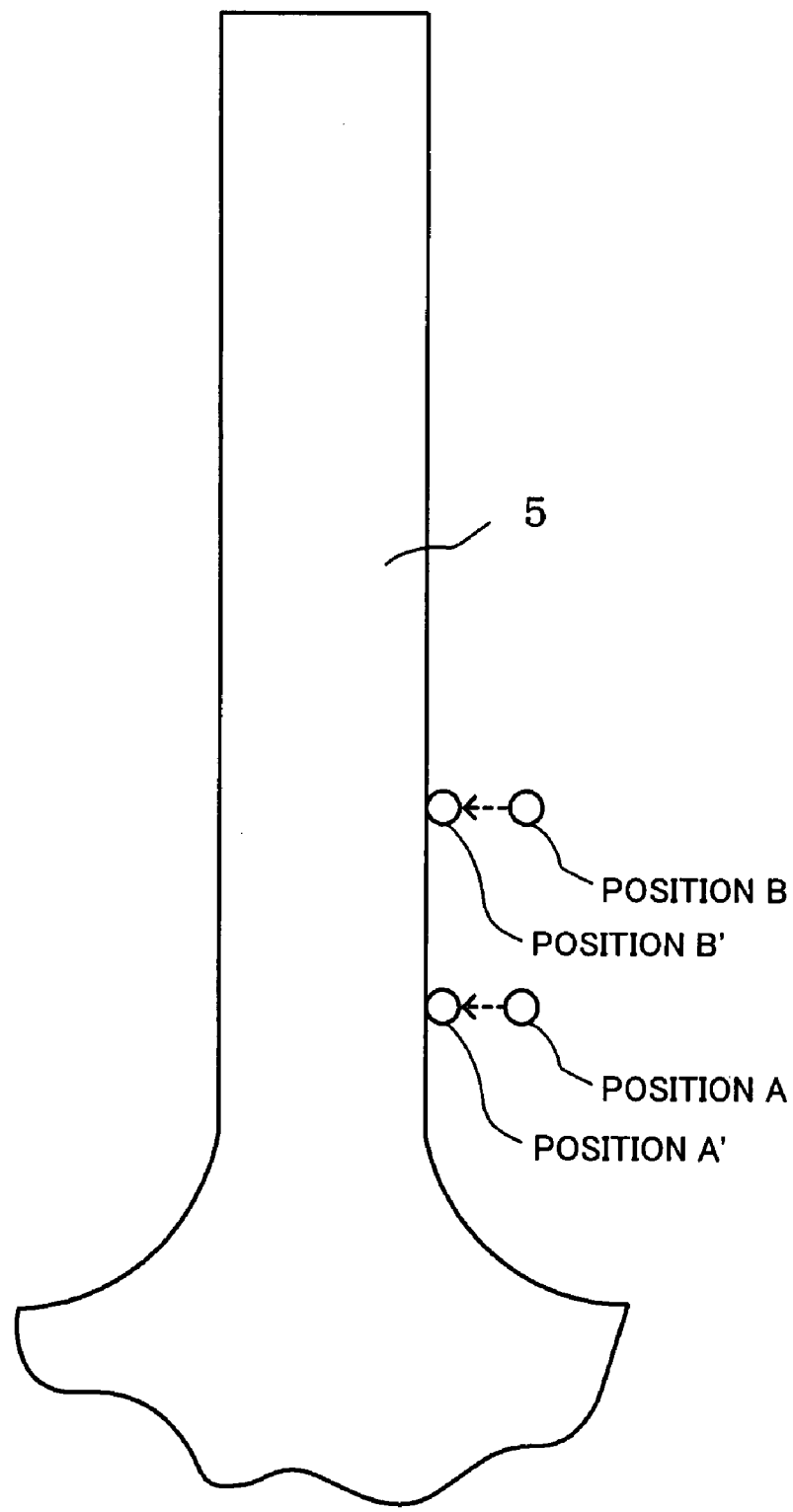
FIG. 6 is an explanatory diagram that shows a positioning method between a laser beam and the resonator tine.

Firstly, as shown in FIG. 6, the laser beam is roughly positioned at a point slightly away from the tine, in the vicinity of the root of the tine (position A). Then, while irradiating the laser beam, the resonator is moved in the width direction (left or right direction in the figure). When the laser beam hits the tine, the tine is worked and an output signal from the differential buffer 35 is changed. Then, the position at this timing is stored (position A'). Next, a position is changed a little in the length direction of the tine (e.g., a distance approximately corresponding to the tine width) (position B), and the resonator is moved in the width direction as previously performed. Then, a position is stored where the output from the differential buffer 35 is changed (position B'). Since a line connecting the position A' and the position B' corresponds to a ridge corner of the tine, machining can be performed using this position as a reference.

A stable machining may not always be performed using any type of laser beam, since the crystal quartz is good in laser beam permeability. For example, machining can be performed by use of a carbon dioxide gas laser of high power. However, the machining is largely affected mostly by heat and this may cause a crack. In view of this point, it is preferable to use so-called femtosecond laser as the laser beam having a pulse width around 100 fsec (femtosecond). Since the femtosecond laser only needs an extremely short time with a pulse width of 100 fsec, it features that machining can be performed without a thermal damage. Therefore, no cracks due to a heat distortion may be generated. Furthermore, a fine machining can be performed, since the machining is applied only to the vicinity of the point being focused, with a central portion of the laser beam having energy more than a threshold. Since only the vicinity of the point being focused is subjected to the machining, it may not affect other portions such as the package.

Following procedures will be recommended to perform substantially finer adjustment.

Figure 7:
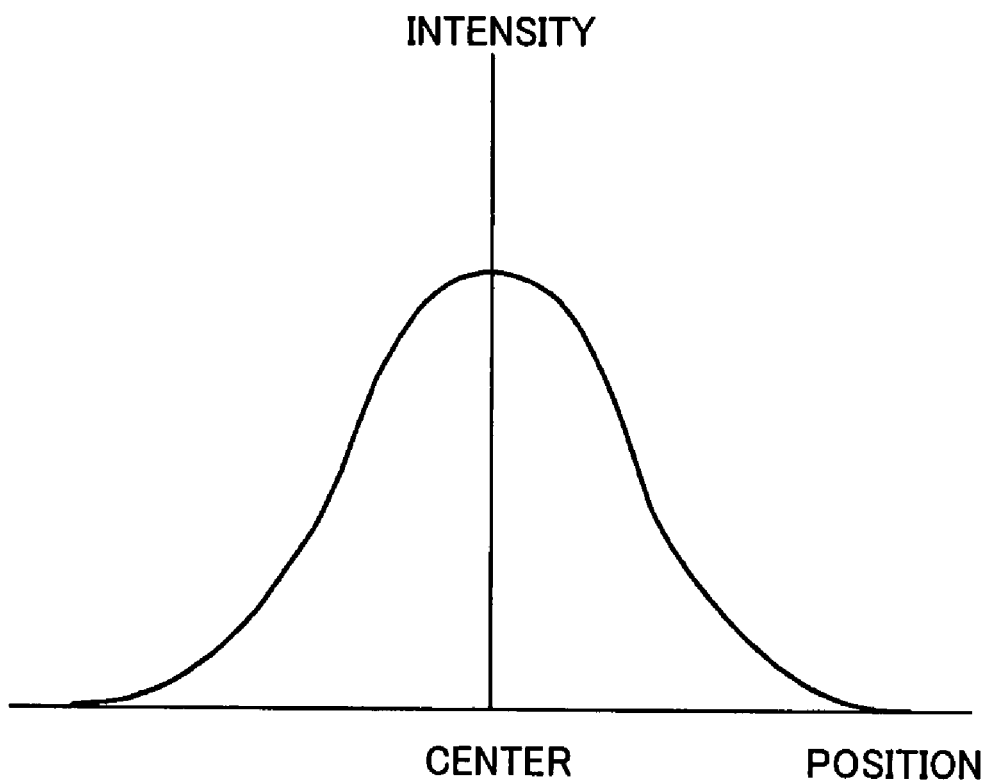
FIG. 7 illustrates an intensity distribution of the femtosecond laser beam.

As shown in FIG. 7, the laser beam becomes more intense when approaching the center of the light and becomes less intense when approaching the edges. The machining using the femtosecond laser has a threshold of intensity, and the machining is carried out only within a region more than the threshold. Therefore, the range where the machining is possible corresponds to the region of inner side of a circle, having a certain radius from the center of the laser beam. When machining is performed at a high speed, it is sufficient that this circle is entirely applied to the target for machining. In order to perform finer machining, it is only required to adjust an overlapping amount indicating how large the circle and the machining target overlap. While monitoring an output signal from the differential buffer 35 (FIG. 5), the laser beam is made to approach the ridge of the tine gradually, thereby achieving a desired fine machining.

Figure 8:
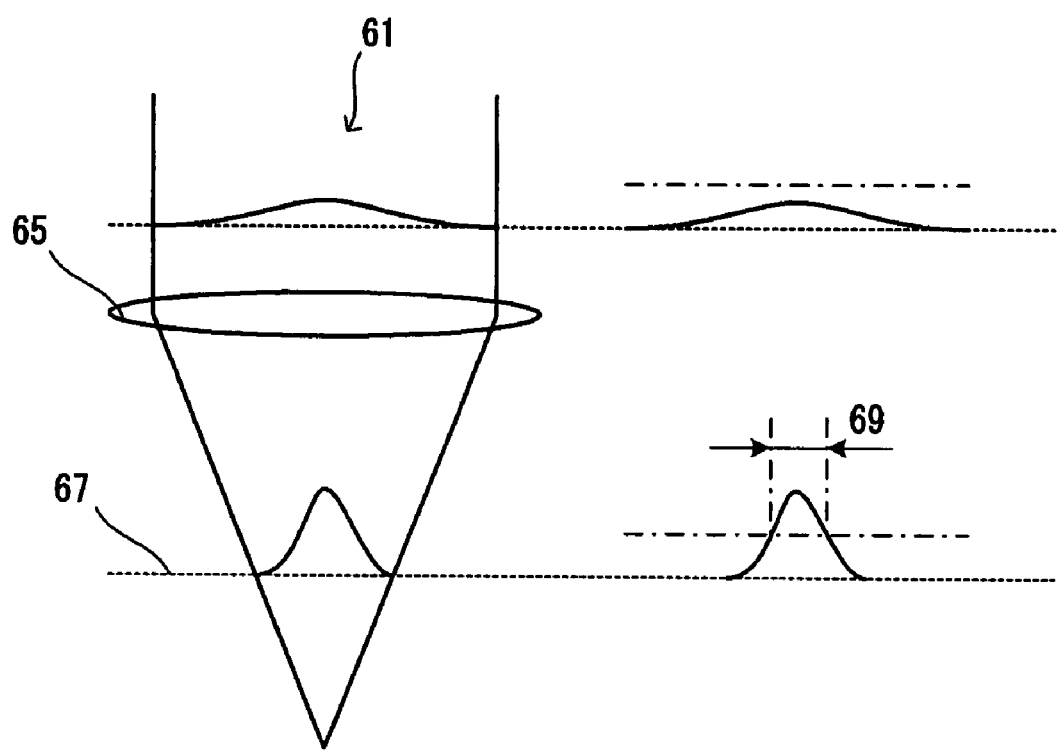
FIG. 8 illustrates an intensity distribution of the laser beam focused by a lens.

As shown in FIG. 8, the laser beam 61 is focused on the worked surface 67 through the lens 65. The diameter 69 of light flux of the laser beam 61 is narrowed by the lens 65. Intensity of the light flux being narrowed exceeds the threshold and machining of a fine portion becomes possible. On the other hand, the laser beam after passing through the worked surface 67 expands the diameter of the light flux, and the intensity is lowered. Therefore, even if a portion other than the worked surface 67 is irradiated by the laser beam, the irradiated portion is not damaged and it is possible to avoid damage by the laser beam on the portion other than the worked surface.

In order to perform a fine adjustment, a beam attenuation filter 57 may be provided on the optical path, which is variable in light fading amount. When an average intensity of the laser beam is lowered by the beam attenuation filter 57, a machinable range having intensity equal to or more than the threshold is made smaller and therefore fine machining becomes possible.

Actually, the methods as described above to control the machining range are combined to perform the fine adjustment, so that the output signal from the differential buffer 35 is made to be within a range equal to or less than a reference value.

The cross-sectional shape of the tine after the adjustment of the leakage vibration towards the detecting vibration becomes a shape obtained by diagonally cutting a corner of the ridge. The cross sectional views of the tine as shown in FIG. 9A and FIG. 9B, and the perspective view as shown in FIG. 10 illustrate an inclined surface formed on the ridge of the tine.

Figure 9A:
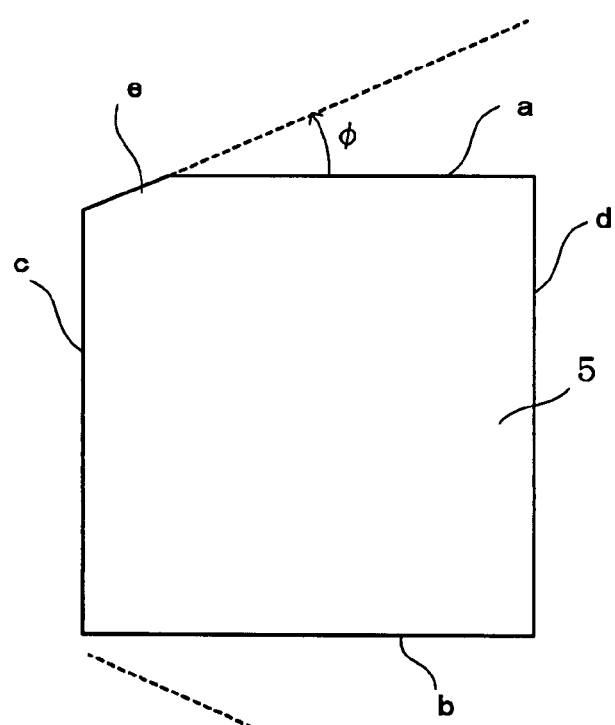
FIG. 9A to FIG. 9C illustrate a cross section of the resonator tine that is adjusted by a process to produce the vibration gyro according to the present invention.
Figure 9B:
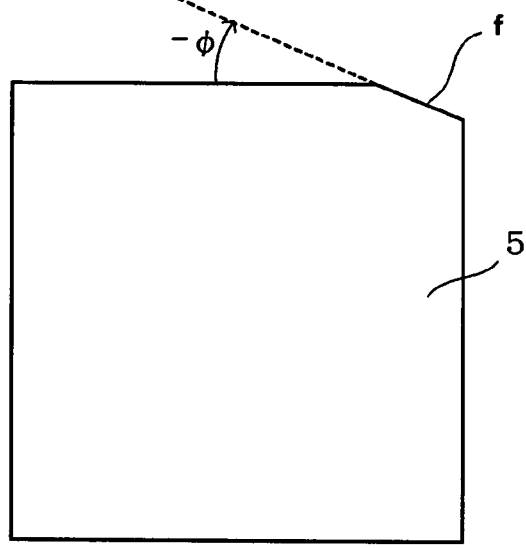
Figure 9C:
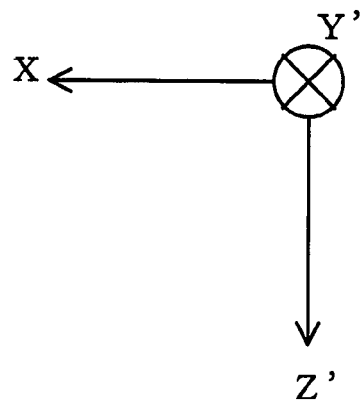
Figure 10:
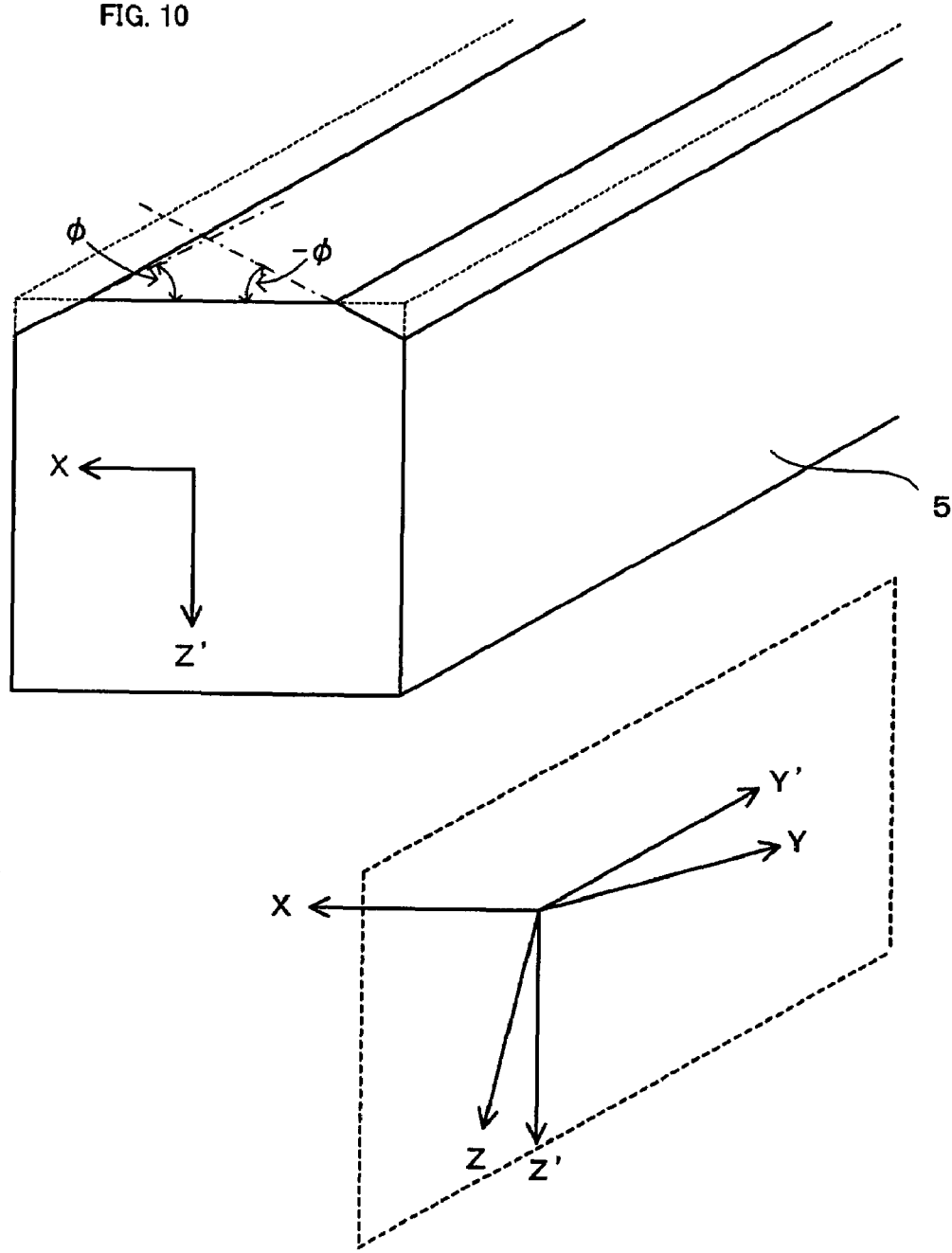
FIG. 10 is a perspective view of the resonator tine that is adjusted by the process to produce the vibration gyro according to the present invention.

FIG. 9A, FIG. 9B, and FIG. 10 illustrate an example that the tine has a rectangular cross section, including an upper surface a and a lower surface b being parallel to the X axis, a first side surface c and a second side surface d being perpendicular to the X axis, and the inclined surfaces e and f are formed on the ridge of both edges of the upper surface a. Alternatively, the inclined surfaces may be formed on both edges of the ridge of the lower surface b.

FIG. 9A illustrates an example that the inclined surface e is formed on one ridge of the upper surface a. A laser beam is irradiated to this ridge for machining, thereby forming the inclined surface e. Illuminating angle of the laser beam on this occasion can be determined by the angle Φ between the line directing to the light source of the laser beam and the upper surface a.

FIG. 9B illustrates an example that the inclined surface f is formed on the other ridge of the upper surface a. A laser beam is irradiated to this ridge for machining, thereby forming the inclined surface f. In the configuration as shown in FIG. 5, the XYZ stage 45 on which the resonator is mounted is turned by 180 degrees on the rotary stage 51, in order to inverse the left-right relationship as shown in FIG. 9A and FIG. 9B. This means that the irradiating direction of the laser beam is inversed. In FIG. 9B, the illuminating angle of the laser beam can be determined by the angle −Φ between the line directing to the light source of the laser beam and the upper surface a.

When these inclined surfaces e and f are equally angled with respect to the upper surface a, an angular relationship with Z' axis becomes the same. However, according to the crystal anisotropy of quartz, the etching rate of the inclined surface e of the X axis in the plus direction (+X axis) may be different from the etching rate of the inclined surface f of the X axis in the minus direction (−X axis).

Thereafter, in order to adjust the detuning degree and to remove an affected layer of the worked surface, the resonator is subjected to etching in a compound liquid of hydrofluoric acid and ammonium fluoride. The worked surface after the adjustment of the leakage vibration towards the detecting vibration has an angle different from that of the Z direction along which the etching can be performed at a high rate. Therefore, changes in the leakage vibration by the detuning degree adjustment are small, and therefore, changes in differential buffer output are also small.

Figure 11:
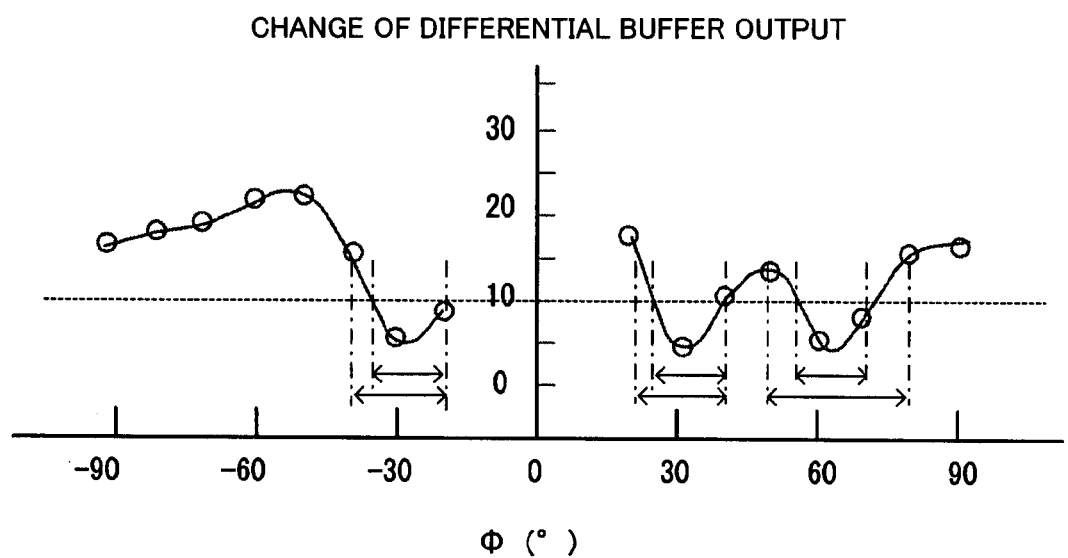
FIG. 11 illustrates a relationship between an illuminating angle Φ of the laser beam and a change in a differential buffer output.

FIG. 11 shows a relationship between the illuminating angle Φ of the laser beam with the X axis and changes in the differential buffer output in the detuning degree adjustment. Here, the illuminating angle Φ of the laser beam corresponds to the inclination of the inclined surface. It is to be noted that the etching time is kept constant in this example. In FIG. 11, the vertical axis indicates a change of the differential buffer output, and it represents a ratio relative to an output value when an applied angular velocity is 1 (one) (deg/sec).

Figure 12:
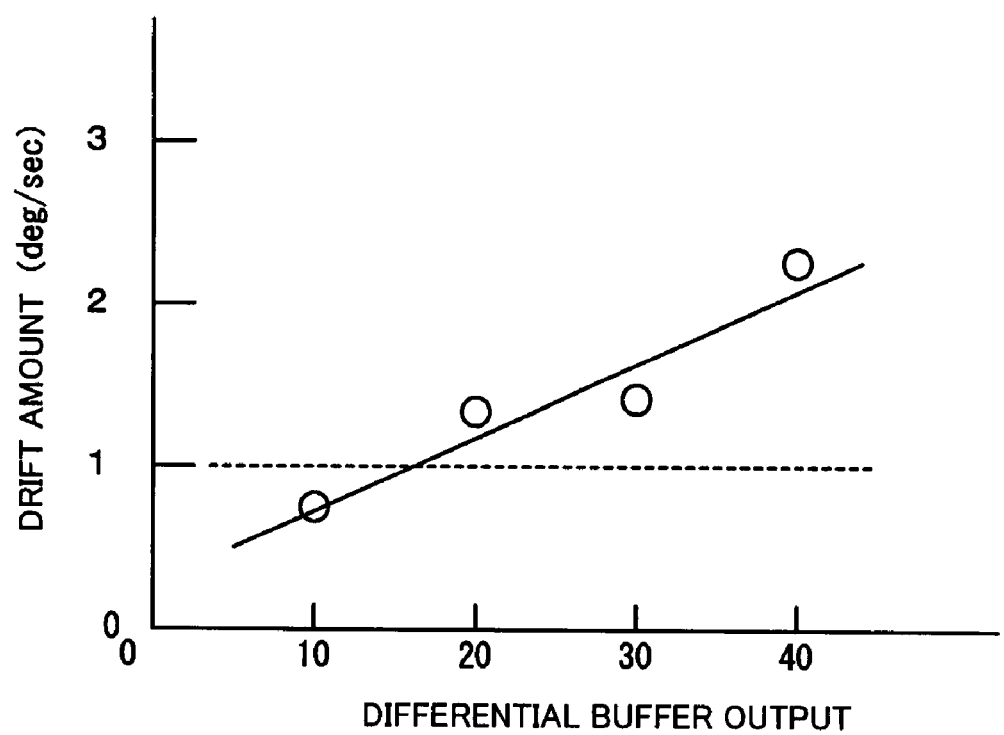
FIG. 12 illustrates a relationship between the differential buffer output and a drift amount.

FIG. 12 illustrates a relationship between the differential buffer output and a drift amount within the whole temperature range, when the angular velocity is not applied. The horizontal axis of the chart of FIG. 12 indicates the differential buffer output, and it represents a ratio relative to an output value when the applied angular velocity is 1 (one) (deg/sec).

The drift amount generally required, caused by the change in temperature, is equal to or less than 1 (one) (deg/sec) in the whole temperature range. In FIG. 12, this drift amount is represented by a broken line. According to the relationship shown in FIG. 12, if the drift amount is made to be equal to 1 (one) (deg/sec) or less, it is necessary that the differential buffer output is equal to or less than a value 15 (fifteen) as shown in the figure.

Therefore, it is necessary that in the detuning degree adjustment, the change of the differential buffer output is to be equal to or less than a predetermined value (in FIG. 12, a value indicated by 15), in addition to a condition that the value of the detuning degree itself is set to be a predetermined value (e.g., 300 Hz).

In an actual adjustment, it is necessary to define the change of the differential buffer output by setting a margin (e.g., ±5) on the adjustment. Therefore, in FIG. 12, the change of the differential buffer output by the etching in the detuning degree adjustment should be equal to or less than 10.

In the relationship between the illuminating angle Φ of the laser beam and the change of differential buffer output as shown in FIG. 11, the angle Φ satisfying a condition that the change of the differential buffer output is a value equal to or less than 10, corresponds to the range from 25° to 40° and from 55° to 70° on the plus side of the X axis, and in the range from −20° to −35° on the minus side of the X axis.

As described above, if the differential buffer output is enlarged by the machining, the rotary stage 51 is turned and the corner on the opposite side is machined. This indicates that a sign of the angle initially used in machining is changed. In other words, if the machining is initially performed at an angle of 30°, it is machined at −30° after the rotary stage 51 is turned. Therefore, it is desirable that the change in the differential buffer output is equally small at both angles; a positive angle and a negative angle of the same absolute value.

Therefore, when the rotary stage 51 is turned and the corner on the opposite side is machined, it is appropriate to set the angle Φ from 25° to 40° and from −20° to −35°, according to a symmetrical property. In particular, it is more preferable that the range of the angle is set to from 25° to 35° and from −25° to −35°, because the change in the differential buffer output becomes further smaller.

A relationship between the angle Φ and the differential buffer output is as shown in FIG. 11, due to the reasons as the following.

Figure 13:
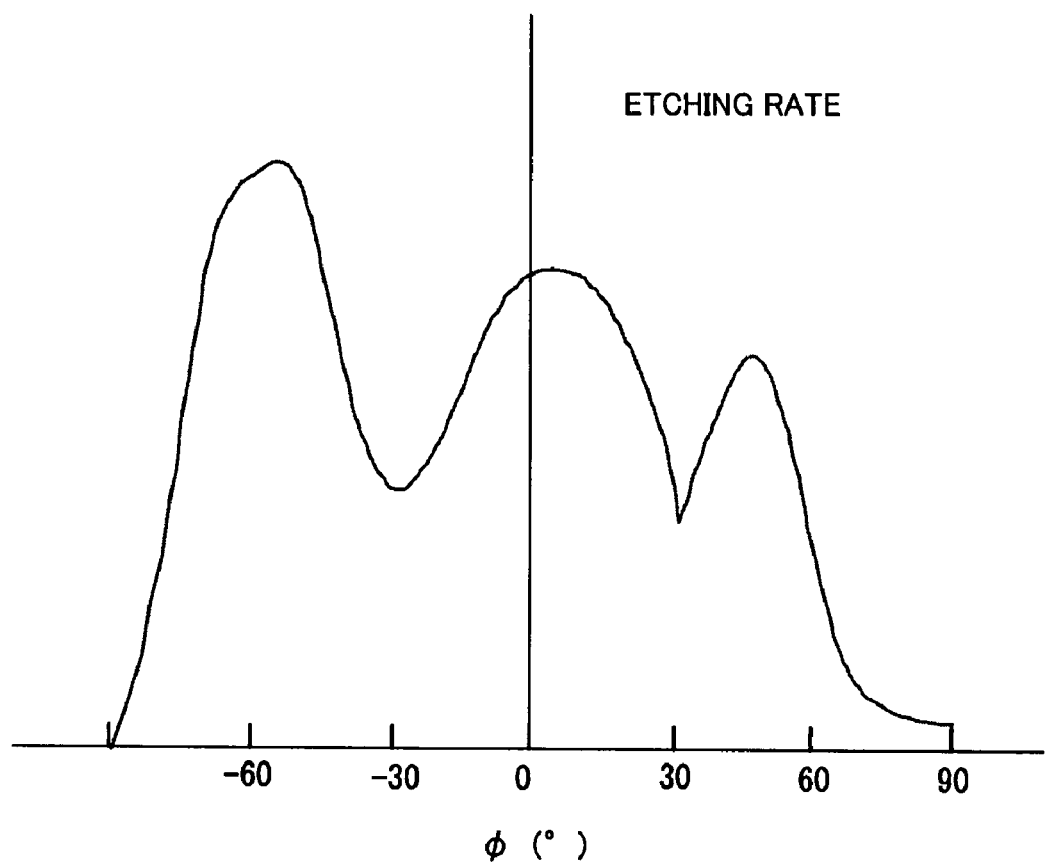
FIG. 13 illustrates a relationship between angle Φ and an etching rate.

Since the quartz is a single crystal having anisotropy, etching rates thereof are different by crystal orientation. FIG. 13 shows a relationship between the angle Φ with the X axis and the etching rate. As seen from FIG. 13, the etching rate is small in the vicinity of the point of 30° and −30°. Therefore, if the angle is set to around 30° or −30° the etching rate becomes small, and a worked portion by the adjustment is not etched so much. Accordingly, even if the detuning degree adjustment is performed, the change in the differential buffer output is small.

Figure 14A:
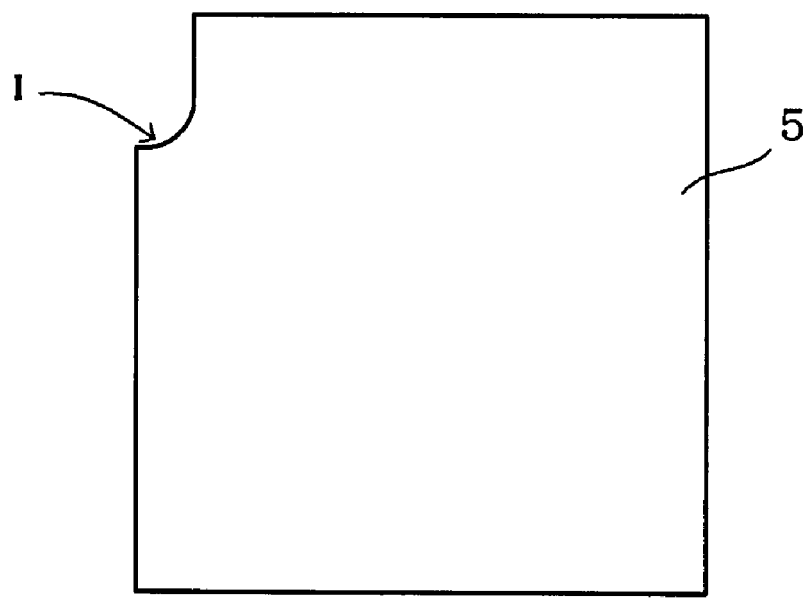
FIG. 14A and FIG. 14B illustrate a cross section of the resonator tine, which is adjusted at the angle Φ=90°.
Figure 14B:
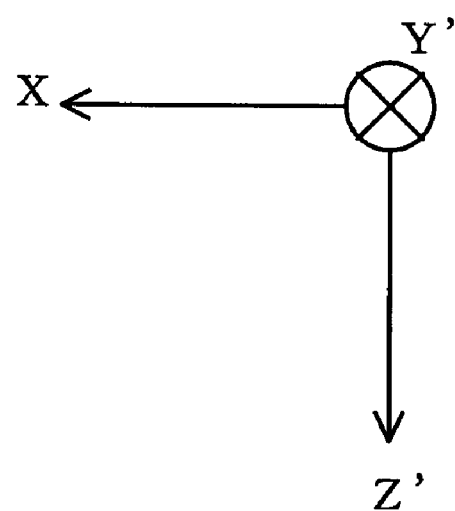
Figure 15A:
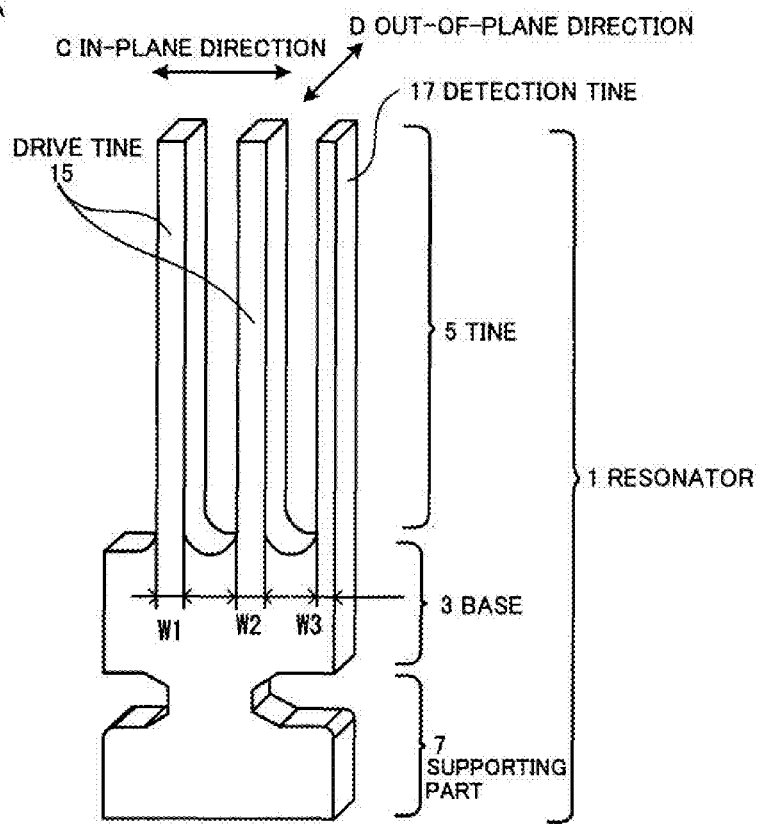
FIG. 15A and FIG. 15B illustrate a conventional resonator of vibration gyro.
Figure 15B:
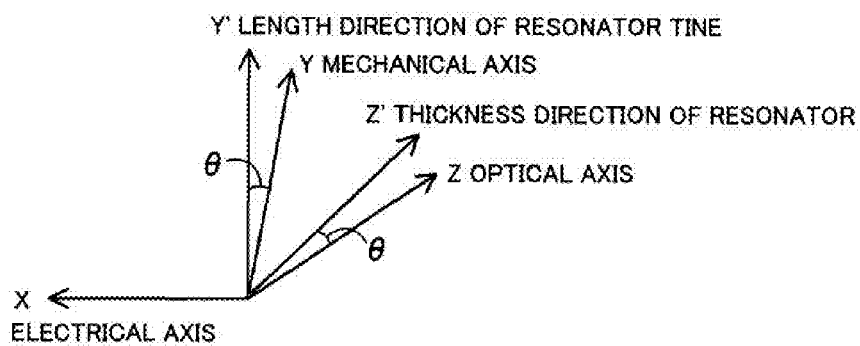
Figure 16A:
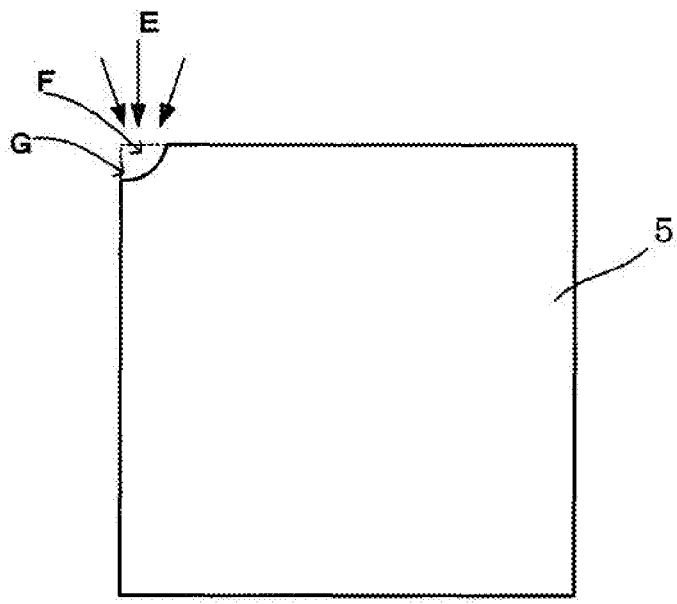
FIG. 16A to FIG. 16C illustrate a cross section of the resonator tine that is adjusted by a conventional process to produce the vibration gyro.
Figure 16B:
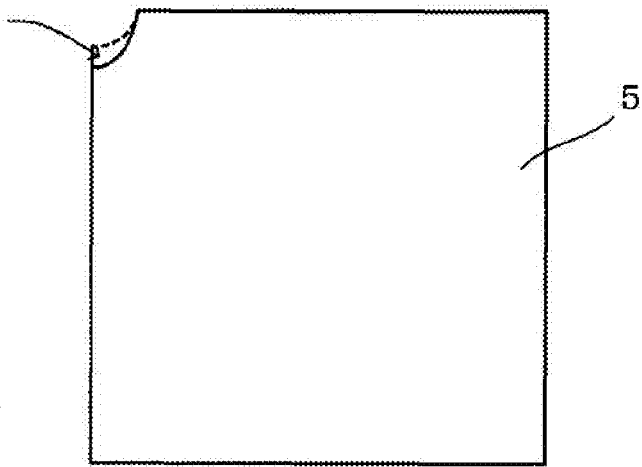
Figure 16C:
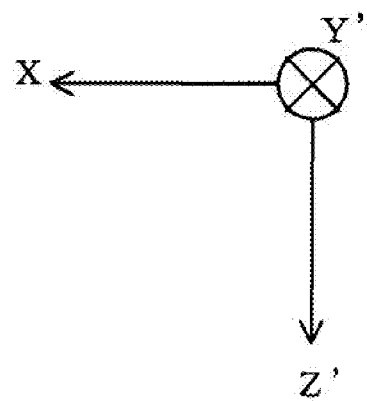

The etching rate is also small in the vicinity of the points of θ=90° and −90°. However, the angle is too deep, and accordingly the cross sectional shape after machining may not have any constant angle. Therefore, it includes a plane almost perpendicular to the Z axis, just as indicated by the lower end I on the left shoulder concave part as shown FIG. 14A. Therefore, an etching amount is increased on this part, resulting in that the differential buffer output is varied largely.

Accordingly, as shown in FIG. 11, the change in the differential buffer output by the angle Φ is represented by the graph including the minimum values in the vicinity of the points −30°, 30°, and 60°.

What is claimed is:

1. A vibration gyro comprising,
a vibration tine including a drive tine and a detection tine, wherein,
the drive tine has a pillar with a rectangular cross section, and at least one ridge extending along the longitudinal direction of the pillar has an inclined surface, and
an inclined angle of the inclined surface is within the range from 20° to 40°, the acute angle being made between a side parallel to a vibrating direction of the drive tine, as one of the sides of the rectangular cross section, and an extended line along the inclined surface.

2. The vibration gyro according to claim 1, wherein,
the vibration tine is made of quartz,
the vibration tine has the pillar with the rectangular cross section, and
in axial directions held by the quartz; electrical axis, mechanical axis, and optical axis, being orthogonal to one another, X axis being the electrical axis is set as a vibrating direction of the drive tine, an axial direction obtained by rotating Y axis being the mechanical axis about the X axis by a predetermined angle θ is set as a longitudinal direction of the drive tine, and an axial direction obtained by rotating Z axis being the optical axis about the X axis by the predetermined angle θ is set as a thickness direction of the drive tine,
the thickness direction is orthogonal to the longitudinal direction and the vibrating direction of the drive tine,
at least one ridge extending along the longitudinal direction of the drive tine has an inclined surface, and
an inclined angle of the inclined surface is within the range from 20° to 40°, which is an angle the inclined surface makes with the X axis in the rectangular cross section.

3. The vibration gyro according to claim 1, wherein,
the vibration tine is made of quartz,
the vibration tine has a pillar with a rectangular cross section, and
in axial directions held by the quartz; electrical axis, mechanical axis, and optical axis, being orthogonal to one another, the X axis being the electrical axis is set as a vibrating direction of the drive tine, an axial direction obtained by rotating the Y axis being the mechanical axis about the X axis by a predetermined angle θ is set as a longitudinal direction of the drive tine, and an axial direction obtained by rotating the Z axis being the optical axis about the X axis by the predetermined angle θ is set as a thickness direction of the drive tine,
the thickness direction is orthogonal to the longitudinal direction and the vibrating direction of the drive tine,
at least one of the ridge extending along the longitudinal direction of the drive tine has an inclined surface,
the inclined surface includes, in the rectangular cross section, at least one of a first inclined surface on +X side ridge and a second inclined surface on −X side ridge,
the inclined angle of the first inclined surface on the +X side ridge is within the range of angles 25° to 40° and 55° to 70°, which are angles the inclined surface makes with the X axis in the rectangular cross section, and
the inclined angle of a second inclined surface on the −X side ridge is within the range of angle 20° to 35°, which are angles the inclined surface makes with X axis in the rectangular cross section.

4. The vibration gyro according to any one of claims 1 to 3, wherein,
the vibration tine comprises two drive tines and one detection tine,
the two drive tines are arranged so that both vibrating surfaces formed by each vibration constitute an identical plane, and
the vibrating surface formed by the vibration of the detection tine is orthogonal to the vibrating surfaces of the drive tines.

5. A process of producing a vibration gyro having a vibration tine including a drive tine and a detection tine and the drive tine having a pillar with a rectangular cross section, the vibration gyro being formed by working at least one ridge extending along the longitudinal direction of this pillar, comprising the step of,
forming an inclined surface on the ridge, and in the rectangular cross section, making an inclination of the inclined surface to be within the range from 20° to 40°, the angle viewed from a side parallel to a vibrating direction of the drive tine, as one of the sides of the rectangular cross section.

6. The process of producing the vibration gyro according to claim 5, having the vibration tine made of quartz, and as for the drive tine thereof, comprising the steps of,
in axial directions held by the quartz; electrical axis, mechanical axis, and optical axis, being orthogonal to one another, X axis being the electrical axis is set as a vibrating direction of the drive tine, an axial direction obtained by rotating Y axis being the mechanical axis about the X axis by a predetermined angle θ is set as a longitudinal direction of the drive tine, and an axial direction obtained by rotating Z axis being the optical axis about the X axis by the predetermined angle θ is set as a thickness direction of the drive tine,
the thickness direction is orthogonal to the longitudinal direction and the vibrating direction of the drive tine,
forming an inclined surface on the ridge, and in the rectangular cross section, making an inclination of the inclined surface to be within the range from 20° to 40°, when viewed from the X axis.

7. The process of producing the vibration gyro according to claim 5, having the vibration tine made of quartz, and as for the drive tine thereof, comprising the steps of,
in axial directions held by the quartz; electrical axis, mechanical axis, and optical axis, being orthogonal to one another, X axis being the electrical axis is set as a vibrating direction of the drive tine, an axial direction obtained by rotating Y axis being the mechanical axis about the X axis by a predetermined angle θ is set as a longitudinal direction of the drive tine, and an axial direction obtained by rotating Z axis being the optical axis about the X axis by the predetermined angle θ is set as a thickness direction of the drive tine,
the thickness direction is orthogonal to the longitudinal direction and the vibrating direction of the drive tine,
forming an inclined surface on the ridge and making the inclined surface to include, in the rectangular cross section, at least one of a first inclined surface on +X side ridge and a second inclined surface on −X side ridge,
making the inclined angle of the first inclined surface on the +X side ridge to be within the range of angles 25° to 40° and 55° to 70°, which are angles the inclined surface makes with the X axis in the rectangular cross section, and
making the inclined angle of a second inclined surface on the −X side ridge to be within the range of angle 20° to 35°, which are angles the inclined surface makes with X axis in the rectangular cross section.

* * * * *